United States Patent [19]
DeFeo et al.

[11] 4,292,023
[45] Sep. 29, 1981

[54] FLUIDIZED BED COMBUSTOR AND REMOVABLE WINDBOX AND TUBE ASSEMBLY THEREFOR

[75] Inventors: Angelo DeFeo, Totowa; William S. Hosek, Mt. Tabor, both of N.J.

[73] Assignee: Curtiss-Wright Corporation, N.J.

[21] Appl. No.: 62,746

[22] Filed: Aug. 1, 1979

[51] Int. Cl.³ .......................................... F23D 19/00
[52] U.S. Cl. .................................. 431/170; 110/245; 110/263; 432/58; 422/143; 34/57 A; 239/600; 165/104.16
[58] Field of Search .......................... 431/7, 170, 187; 110/263, 243, 244, 245, 347; 122/4 D; 432/15, 58; 201/31; 422/137, 143, 145; 165/104 F; 239/600, 424; 34/57 A, 57 R; 423/DIG. 16; 48/201

[56] References Cited

U.S. PATENT DOCUMENTS

| | | | |
|---|---|---|---|
| 2,812,592 | 11/1957 | Knibbs et al. | 34/57 A |
| 3,462,246 | 8/1969 | Copeland | 422/143 |
| 3,553,847 | 1/1971 | Kramer et al. | 422/143 |
| 3,861,862 | 1/1975 | Steever et al. | 34/57 A |
| 4,171,945 | 10/1979 | Lazenby | 431/7 |

FOREIGN PATENT DOCUMENTS

866481  4/1961  United Kingdom ............ 165/104 F

Primary Examiner—Samuel Scott
Assistant Examiner—Lee E. Barrett
Attorney, Agent, or Firm—McGlew and Tuttle

[57] ABSTRACT

A fluidized bed combustor comprises a housing having a chamber therein with a top having a discharge for the gases which are generated in the chamber and a bottom with a discharge for heated fluid. An assembly is arranged in the lower portion of the chamber and the assembly includes a lower plate which is mounted on a support flange of the housing so that it is spaced from the bottom of the chamber and defines a fluid plenum between it and the bottom of the chamber for the discharge of heated fluid. The assembly includes a heat exchanger inlet plenum having tubes therethrough for the passage of fluidizer air and a windbox above the heat exchanger plenum which has a distributor plate top wall. A portion of the chamber above the top wall defines a fluidized bed.

18 Claims, 7 Drawing Figures

FLUIDIZED BED COMBUSTOR AND REMOVABLE WINDBOX AND TUBE ASSEMBLY THEREFOR

The Government has rights in this invention pursuant to Contract No. EX-76-C-01-1726 awarded by the U.S. Energy Research and Development Administration, now known as the Department of Energy.

BACKGROUND OF THE INVENTION

1. Field of the Invention

This invention relates, in general, to fluidized bed combustion and, in particular, to a new and useful fluidized bed combustor which includes a reaction chamber having a removable assembly therein which includes a heat exchanger inlet plenum, a windbox with fluidizer air tuyeres and a mounting for heat exchanger tubes and which is separately supported within the combustor housing.

In the operation of fluidized bed combustors where the fluidized bed is cooled by a cooling fluid which is circulated through tubes which extend up into the bed, it is not unusual that the various operating parts including the heat exchanger tubes must be examined and/or replaced during the operation of such devices. The difficulty with the known construction is that the heat exchanger tubes which are used for cooling the fluidized bed are not easily accessible and, in addition, even when damage or repair is evident it cannot be replaced without a major shutdown of the combustor and a disassembly of a portion of the housing to facilitate removal and replacement of the various parts.

SUMMARY OF THE INVENTION

In accordance with the present invention, there is provided a fluidized bed combustor which includes a chamber having support means adjacent the bottom thereof for supporting a whole assembly which includes a movable heat exchanger windbox and distributor plate together with a mounting for the heat exchanger tubes. With such an arrangement, the whole assembly of the tubes for supplying and removing the heat exchanger fluid to the fluidized bed as well as the need for directing the coal and fluidizer air into the bed may be easily removed through the bottom of the housing for replacement of the whole assembly or any part thereof. In addition, the assembly which is subjected to high temperatures during the operation of the device may be mounted on support elements such that this high temperature assembly is insulated from the support. In this manner, the heat which is generated in the reactor will not be dissipated to the outside through the housing parts.

Accordingly, it is an object of the invention to provide a fluidized bed combustor and removable windbox and tube assembly therefor which comprises a housing having a chamber therein with a top being provided with a discharge for the gases generated in a combustor and a bottom having a discharge for heated fluid and which further includes an assembly supported in the lower portion of the housing chamber which includes a heat exchange plenum and a windbox above the heat exchange plenum having a distributor plate top wall above which a fluidized bed is defined in the chamber and which is supported on support means extending outwardly from the interior of the housing into the chamber above the bottom so that the space between the assembly and the bottom defines a discharge plenum which opens into a discharge for heated fluid and which further includes means for directing fluidized air into the assembly through the heat exchanger inlet plenum and into the windbox for discharge through tuyere means which are mounted in the distributor plate into the fluidized bed and which further includes means for directing coal into the fluidized bed for ignition with the fluidized air for the heating of heat exchanger tubes which extend into the fluidized bed and which are mounted in the assembly and which advantageously have a cooling fluid inlet for the inflow of the bed cooling air and a discharge which discharges into the plenum for discharge out of the chamber. A further object of the invention is to provide a removable assembly of windbox, heat exchanger inlet plenum and heat exchanger tube mounting means for use in a fluidized bed combustor arranged to provide an easy mounting within the combustor for connection to an inlet for fluidizing air and another inlet for cooling fluid and which contain the heat exchanger inlet plenum having tubes therethrough for flow of the fluidizing air into a windbox in a distributor plate having tuyeres for the discharge of the fluidizing air into the fluidized bed. The assembly also includes means for mounting a tube assembly for the inflow of cooling fluid from the heat exchanger inlet plenum upwardly into the tube extending into the bed and then for downward flow through the tubes and to a discharge plenum which would be defined below the assembly when it is mounted in the chamber.

A further object of the invention is to provide a method of erecting and disassembling a fluidized bed reactor which comprises a housing which has separable upper and lower shell portions and wherein an assembly comprising heat exchanger tubes, a distributor plate for directing fluidizing air and providing a support for a fluidized bed as well as a windbox, heat exchanger inlet plenum and a bottom section defining a support flange are supported on a ring of the lower shell portion and wherein the assembly is first connected to the lower shell portion after it has been separated from the upper shell portion, and the lower shell portion with the assembly are connected to the upper shell portion advantageously with the interposition of the insulation means therebetween to prevent the transfer of the high temperature heat of the assembly through the housing of the reactor.

A further object of the invention is to provide an improved tuyere construction and a method of aligning and mounting a tuyere on a distributor plate so that the discharge passages thereof may be aligned in respect to heat exchanger tubes which are maintained in a fluizided bed. A still further object of the invention is to provide an improved tuyere construction for directing fluidizing air into a fluidized bed which is capable of operating at high temperatures and may be accurately aligned and positioned in respect to the fluidized bed.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
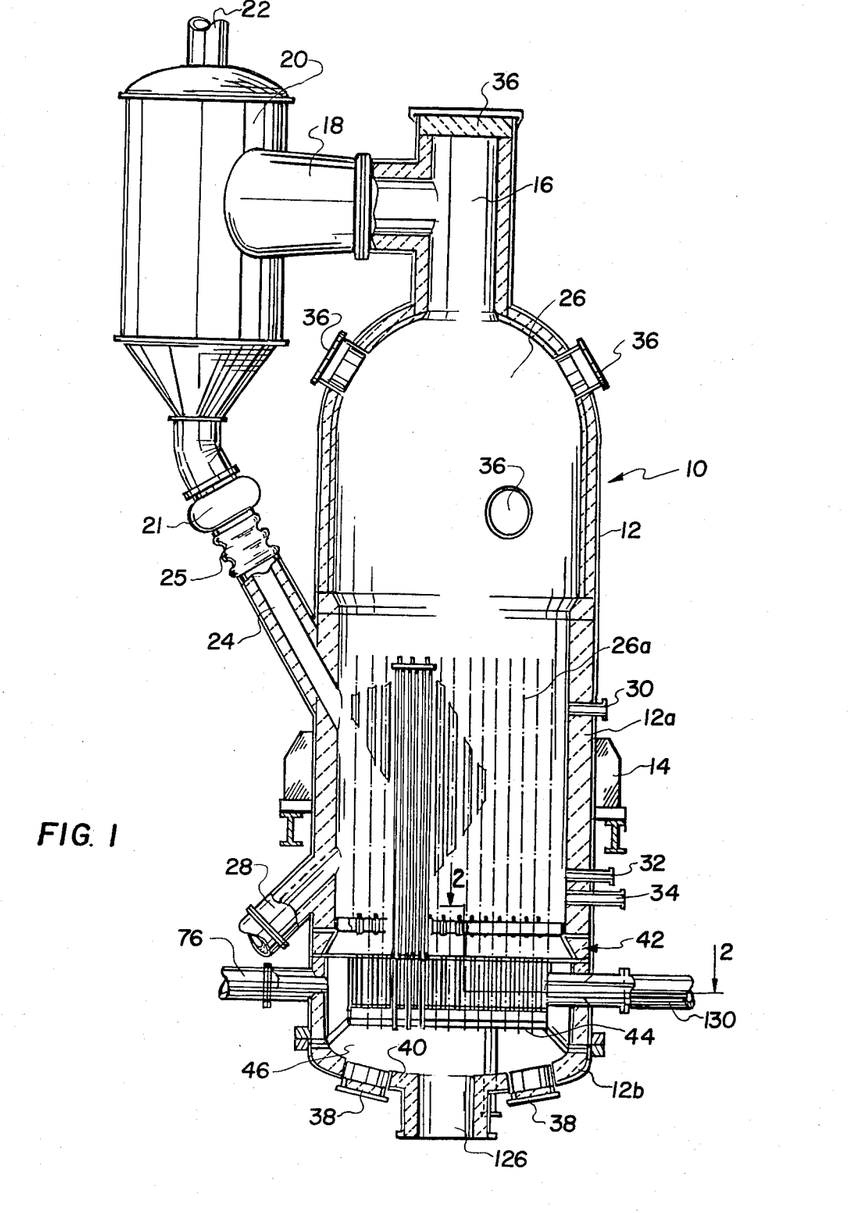
FIG. 1 is a vertical sectional view partly in elevation of a fluidized bed combustor constructed in accordance with the invention.

Referring to the drawings in particular, the invention embodied therein comprises a fluidized bed combustor which is advantageously of a type wherein a fluid such as air is circulated to the combustor for cooling a fluidized bed and for absorbing the heat therefrom and for using the air for operating a machine such as a gas turbine. The combustor 10 includes a housing generally designated 12 having an upper shell portion 12a and a lower shell portion 12b which is separable therefrom and which may be clamped back thereto. The whole housing 12 is supported on a support 14 which makes it possible to disconnect the lower portion 12b from the upper portion 12a and withdraw it downwardly while the upper portion 12a remains attached to the support 14. The housing 12 includes a top having a flue offtake 16 for combustion gases entrained of matter which is delivered through a conduit 18 into a dust separator 20. Clean gases are withdrawn through a stack or flue 22 and separated dust is delivered downwardly through a trickle valve 21 in a return conduit 24 into the interior of the housing into a reaction chamber 26 therein which is maintained under pressure and which has a fluid bed portion 26a at the lower end thereof. The conduit 24 has a bellows portion 25 to permit thermal expansion and retraction. Spent ashes from the fluidized bed 26a are removed through an ash discharge 28 which connects into the lower end of fluidized bed portion 26a. A side wall of the reactor also provides a mounting for an absorbant gun 30 directing an absorbant material into the fluidized bed 26a. In addition, an oil gun 32 and a plurality of coal feed guns 34 are provided in the side wall to direct oil and/or fuel into the reaction chamber to provide a support for combustion during the operation of the device.

The housing 12 is also provided with many manholes 36 for the top part 12a as well as two additional manholes 38 in a bottom wall 40 of the housing. These manholes are large enough to provide access into the interior of the housing 12.

Figure 4:
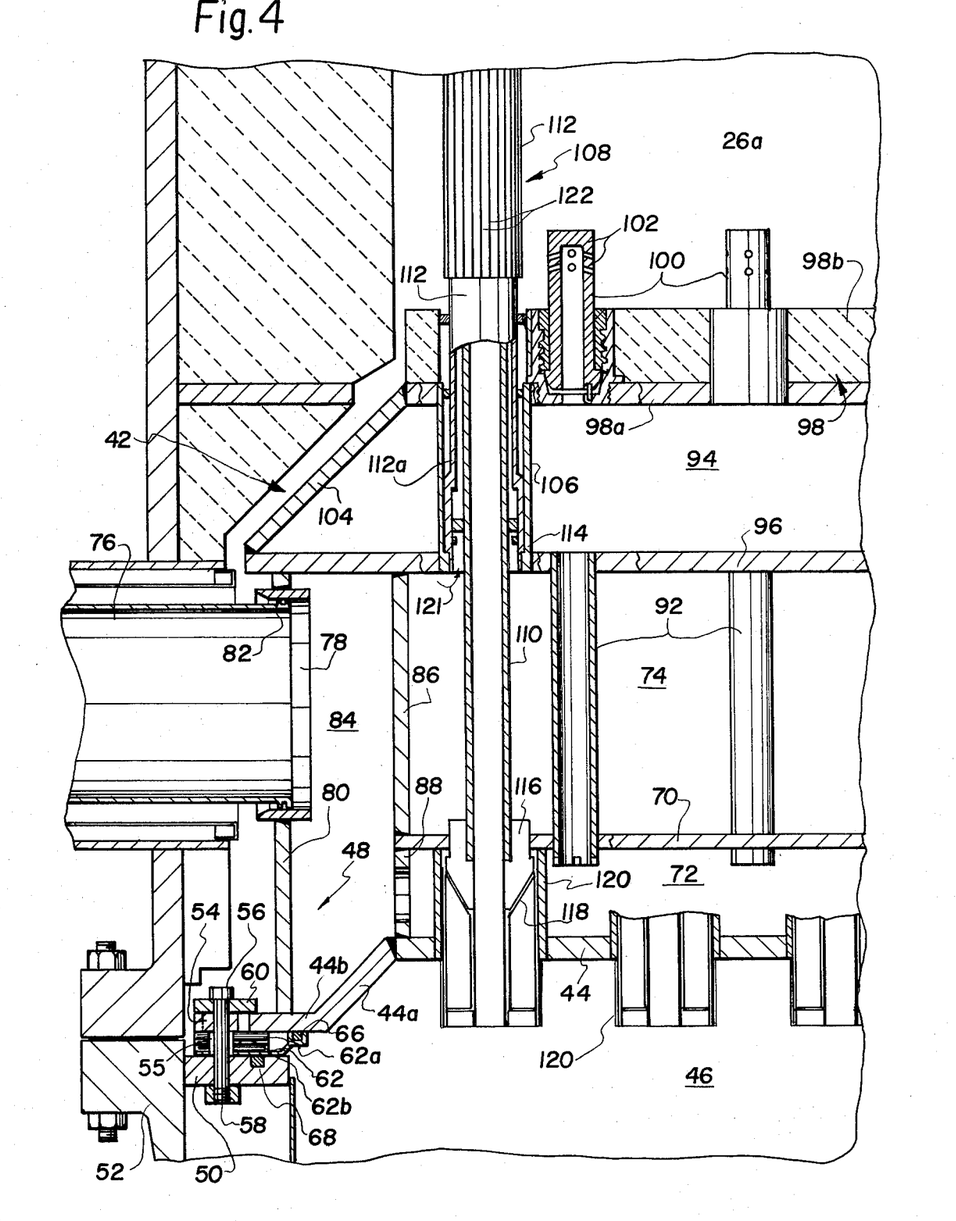
FIG. 4 is a view similar to FIG. 1 showing a further detail of the removable windbox and tube assembly with the combustor shown in FIG. 1.

In accordance with the invention, a removable windbox, heat exchanger inlet plenum and heat exchanger tube support assembly generally designated 42 is removably positioned within the housing below chamber 26 so that a bottom mounting wall 44 thereof is spaced upwardly from the bottom wall 40 of the housing 12 so as to define a plenum chamber 46 therebetween. The assembly 42 is mounted on support means 48 which comprises a circular annular flange 50 positioned around the interior of the lower end of the housing 12 and carried by a clamping joint 52 as best seen in FIG. 4. For this purpose, the bottom plate 44 includes an offset portion 44a having a flange 44b which is interrupted circumferentially. In the preferred construction, flange portion 44b has twenty-four equally spaced, rectangular slots machined into the outer perimeter. Position lugs 54 fit into the slots of the flange 44b and they are attached to the supporting flange 50 by fit screws or bolts 56 for positioning the lugs 54, the flange 50 and a nut plate 58 are reamed and tapped as applicable to accurately locate the assembly relative to the housing 12 and chamber 26. Twenty-four retaining plates 60 overlie respective areas of the plate 44b and are clamped to the positioning lugs 54 and through the flange 50. Clearance is provided between the positioning lugs 54 and the bottom of the flange slots of the flange 44b to allow for the thermal growth of the heat exchanger and distributor assembly. The positioning lugs and slot arrangement maintains the position of the assembly during thermal growth or temperature changes.

In order to minimize the thermal stresses in the lower flange, a thermal barrier is required to isolate the hot support plate 44 from the relatively cool vessel flange 50. This thermal barrier designated 62 comprises twelve layers of $\frac{1}{8}$ in. thick ceramic fiber insulation with each four layers separated by a wire screen. The assembly is sewed together with glass thread for handling purposes. A segmentated plate 62a covers the top of the thermal barrier 62 and a seal plate assembly 62b covers the bottom. Spacers 55 limit the amount of compression of the insulation and transmits the heat exchanger distributor loads to the vessel flange 50. The construction includes a seal packing 66 located in the seal plate assembly 62b and a packing 68 is located in flange 50 so as to seal the bottom of the joint, the support means and the assembly.

The assembly 42 includes a wall 70 which forms a top wall of a lower fluidizing air inlet section 72 and it comprises the bottom wall of a heat exchange inlet plenum 74. The fluidizing air inlet section 72 is supplied with fluidizing air from a fluidizing air supply tube 76 which is fitted into sealing engagement with a tubular fitting 78 at an inwardly spaced location from its sealed entrance into the housing 12. The tubular fitting 78 is supported on a outer side wall 80 of the assembly 42 and is provided with sealing means which permit interengagement of the supply tube with the assembly in a sealed manner. Fluidized air is admitted through one or more of the supply tubes 76 to an annular space 84 defined by the outer side wall 80 of the assembly and an inner side wall 86 of the heat exchange plenum 74 and a continuation 88 thereof which forms a side wall of the fluidizing air inlet section 72. Advantageously four air supply tubes 76 are provided for the fluidizing air which flows into one of many inlet openings or ports of the fluidizing air inlet section 72. The number of such ports may, for example, comprise some sixty in number. The air flows throughout the section 72 and then flows upwardly through vertical pipes or tubes 92 which extend through the heat exchange inlet plenum 74 and discharge into a windbox 94 defined between a top wall 96 of the heat exchange plenum 74 and a distributor plate assembly 98 which is spaced vertically upwardly therefrom and defines a top wall of the windbox for the fluidizing air. Air from the windbox 94 is then circulated upwardly through tuyeres or nozzles 100 which extend through the distributor plate assembly 98 directed outwardly through downwardly sloping ports or passages 102 to the chamber portion 26a at the lower end of the fluidized bed. During the startup cycle, 1000° F. air circulates in this manner and uniformly heats the windbox 94 and the fluidizing air inlet section 72 to minimize thermal stresses. The structure also provides adequate heat paths between the sections so that thermal stresses are minimized during bed soak-back after shutdown. Windbox 94 has side walls 104 and the distributor plate 98 includes a bottom metallic plate portion 98a with an overlying cast insulation portion 98b.

The distributor plate 98 and the wall 96 are interconnected by tubes 106 which, in the preferred arrangement, numbers in excess of one-hundred and seventy-five tubes that provide mounts or sockets for heat exchanger tube assemblies generally designated 108. The heat exchanger tube assemblies include an inner tube portion 110 arranged within its space radially inwardly of an outer tube portion 112. The lower end of the outer tube portion 112 is provided with an adapter 112a which is engaged on a shoulder 114 formed in each of the tubes 106. The inner tube portion 110 is much longer than the outer tube portion 12 and is connected, through a conical adapter 116, to a conical adapter 118 which, in turn, is connected to tubular element 120 which is connected to plate 44. The inner tube portion 110 is spaced radially inwardly from the outer tube portion 112 so as to define an air cooling fluid inlet 121 at the location of the heat exchange inlet plenum top wall 96. The flow of the cooling air is upwardly through the outer tube portion and into the fluidized bed area 26a and heat is transferred in the cooling fluid by the fluidized bed which is enhanced by the provision of fins 122 which are formed on both the outside and inside surface of the outer tube portion 112. Air which is heated when it flows upwardly in the space between the outer and inner tube portions 112 and 110 is then directed downwardly through the top of the inner tube portion 110 and flows downwardly through the inner tube portion 110 and is discharged into the plenum 46 and exits through a discharge opening 126 through the bottom wall 40 of the housing 12.

Figure 3:
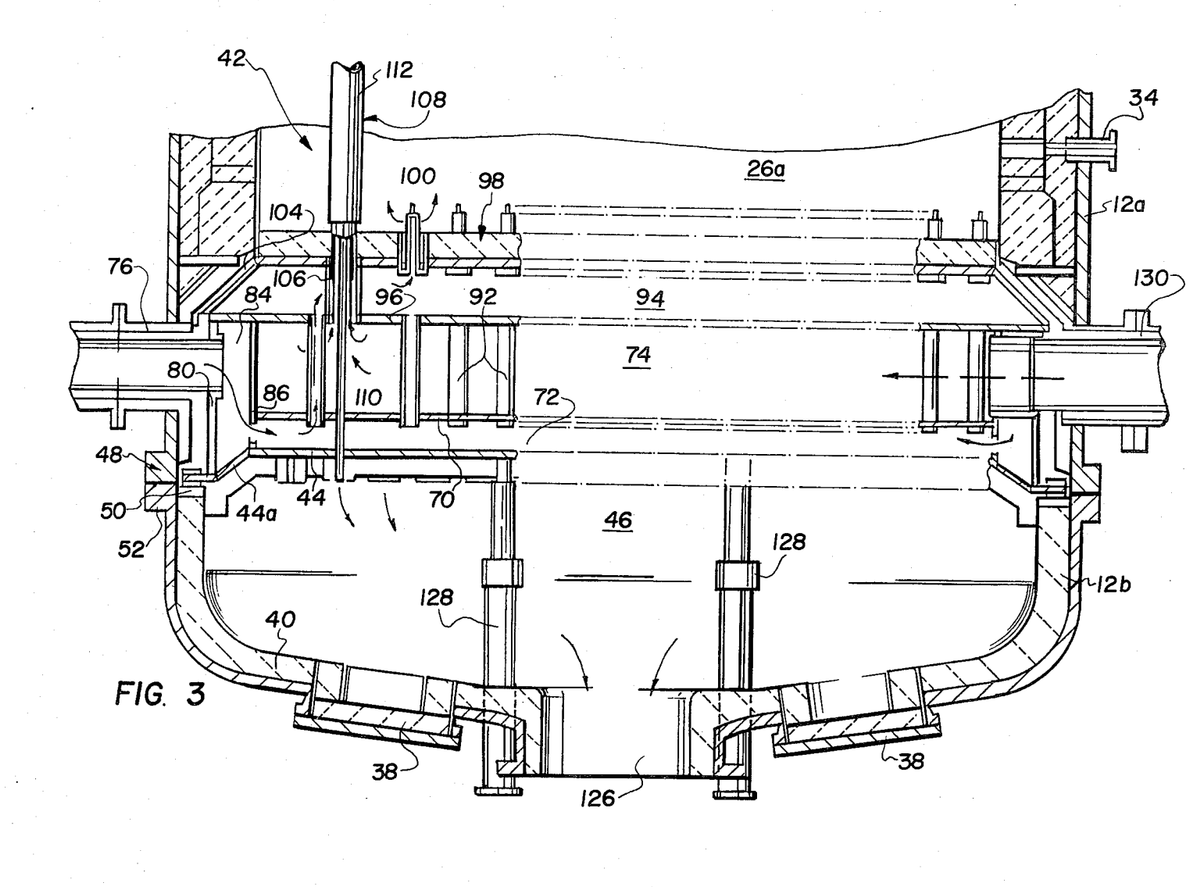
FIG. 3 is a view similar to FIG. 1 showing an enlarged detail of a portion of the combustor shown therein.

The tubes 106 are spaced approximately 10 inches apart and in a square pattern. This produces a corridor of about 4 inches wide between the two rows. The tuyeres or nozzles 100 are located in the centers of these squares and over one-hundred-eighty are advantageously employed, distributed over the area except in those locations where four vertically extending coal guns 128 are provided which are shown best in FIG. 3 and extend inwardly from the exterior of the vessel through the plenum 46, wall 44, the heat exchange inlet plenum 74, windbox 94 and the distributor plate assembly 98 and discharge into the fluidized bed area 26a. The top wall portion 98b of the distributor plate 98 is provided with thermal insulation of about five inches of castables. The wall 96 contains openings for receiving the individual tubes 92 and for the passage of the coal gun tubes.

A cooling fluid or a heat exchange fluid, such as air, is directed into a plurality of conduits 130 which communicate with the interior of the heat exchanger inlet plenum 74. The fluid, such as air, is circulated around the tubes 92 and then through the inlet 121 defined between the outer and inner tube portions 112 and 110 of the heat exchanger tube assemblies 108. The fluid serves to cool the fluidized bed and/or to heat the cooling fluid so that it may be used for purposes of driving machinery such as a gas turbine.

When the assembly 42 is to be removed, it is advantageous to separate the lower shell portion 12b from the upper shell portion 12a. Thereafter, the bolted connections 56 may easily be loosened and the whole windbox and heat exchanger assembly 42 removed from the lower shell portion 12b. Before this time, the fluidizing air inlet pipe 76 is detached from the fittings 78. For these purposes, these fittings 78 are bored to accept a piston ring of the fluidizing air tube 76 which forms part of the sealing means 82. The piston ring may permit an easy sliding disengagement of the two parts. In addition to the fact that the whole assembly 42 may be removed together with the heat exchanger tube assemblies 108, these tube assemblies 108 may be easily separated from the remaining portion of the assembly 42 and for this purpose they are advantageously arranged in groups which may be easily lifted outwardly from their connecting elements after they are detached. Reinsertion of the tube assemblies or groups thereof may be carried out in a similar manner and just as easily. Either the assemblies are first attached into groups and inserted or they are separately installed after the remaining portion of the group is inserted in the reactor and this can be done for example by access through one of the manholes 36 in the top section 12a or by supporting the upper section and lowering the lower section 12b from the upper section 12a.

Figures 5, 6, 7:
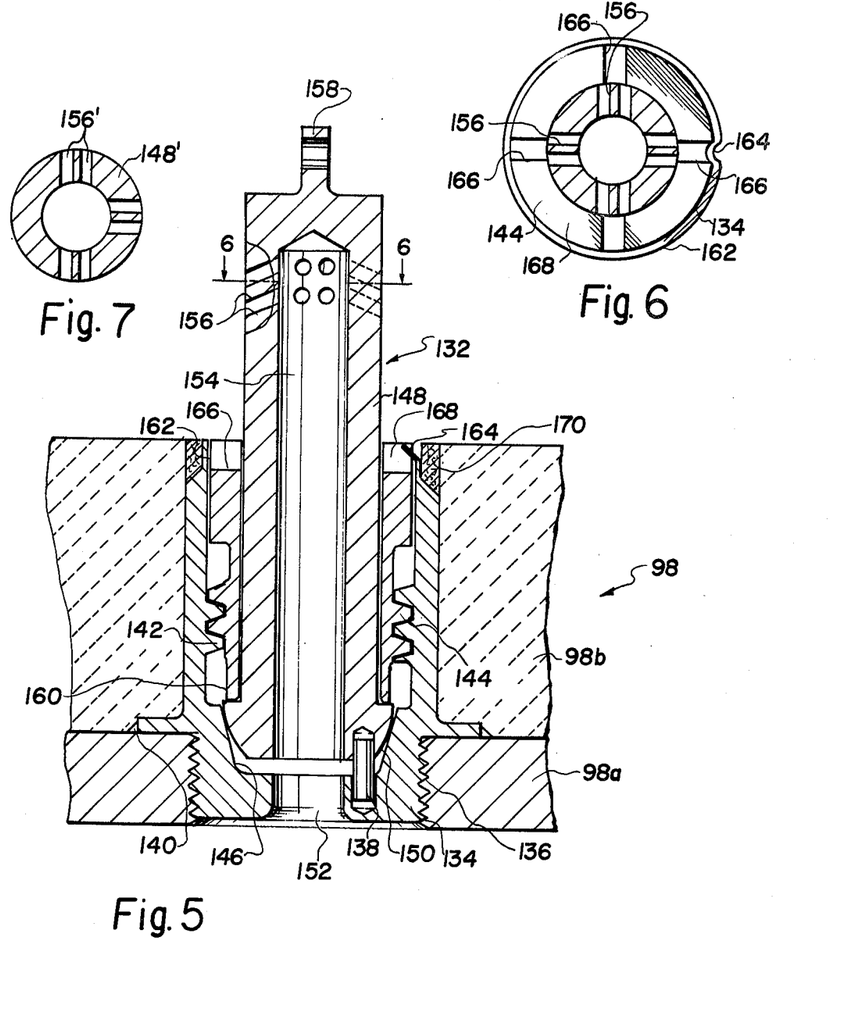
FIG. 5 is an enlarged partial sectional view of an improved tuyere constructed in accordance with the invention.
FIG. 6 is section taken along the line 6—6 of FIG. 5.
FIG. 7 is a view, similar to FIG. 6, of a portion of the tuyere of another embodiment of the invention.

Referring to FIGS. 5, 6 and 7, in accordance with the invention, there is provided an improved tuyere, generally designated 132, which includes an outer socket portion or sleeve 134 having a threaded part 136 which is threadably engaged with the plate 98a. When the socket portion 134 is threaded into the plate 98a, it is turned until it is oriented to align a dowel indicating pin 138 in a selected angular position chosen to provide direction to air and discharge from the tuyere when it is completely assembled. When this position is obtained, the socket portion 134 is anchored in position, for example, by welding at 140 to the plate 98a.

Figure 2:
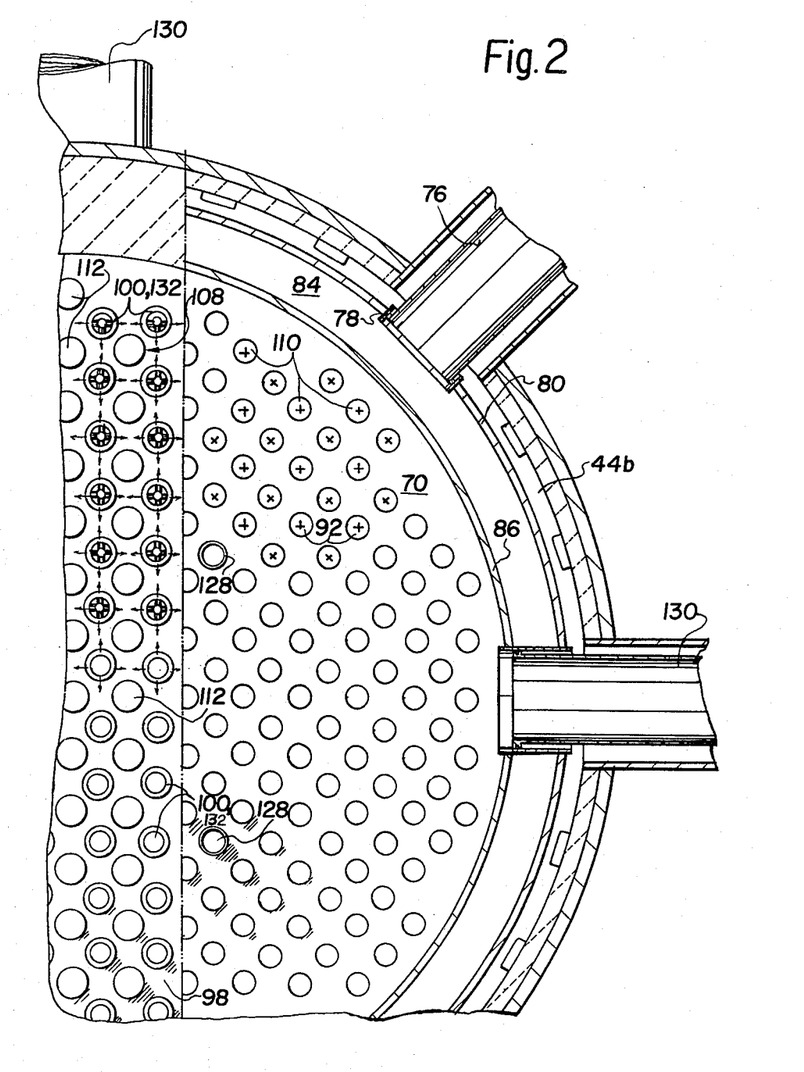
FIG. 2 is an enlarged partial sectional view taken along the lines 2—2 of FIG. 1.

The socket portion 134 is internally threaded and is advantageously provided with a coarse thread 142 such as an Acme thread, on its interior which is loosely engaged with a similar coarse thread of a retaining sleeve or nut 144 so as to prevent possible seizure. The socket body 134 also includes an inner part having a conically-formed bearing surface 146. A sleeve body 148 of the tuyere has a lower end with a spherically-formed surface which bears against the conically-formed surface 146 providing a tight seal. In addition, it has an opening which is aligned over the dowel indicating or centering pin 138. The socket 134 defines an inlet opening 152 which communicates with a central passage 154 of the sleeve body 148. The central passage 154 communicates, in turn, with one of a plurality of downwardly extending discharge passages 156 which, in the embodiment of FIGS. 5 and 6, are arranged in pairs disposed at right angles to each so that fluidizing air is discharged into a fluidizing bed at four equally, angularly spaced locations. As shown in FIG. 2, tuyeres are advantageously arranged between the heat exchanger tube assemblies 108 and the discharge air streams are directed between the tube rows. In the embodiment of FIG. 7, only three angular positions of discharge for discharge passages 156' are shown for the alternate embodiment of sleeve body 148'. These are located on the perimeter of the bed so that air is not directed towards the shell walls. It is the positioning dowel 138 that determines the orientation of the discharge passages, and with this inventive arrangement, the position may be easily determined when the socket portion 134 is secured to the plate 98a.

The sleeve body 148 advantageously includes a lug portion 158 defining a lifting eyelet which may be engaged by a crane to lift the device upwardly. To facilitate the installation of the sleeve body 148 to the socket body 134 and to permit a mounting of the sleeve body 148 so that they will remain tight and provide a seal so that all the fluidizing air will discharge through the tuyere discharge passages 156, the retaining sleeve 144 is threaded by the Acme thread 142 into a position at which it presses the surface 150 into engagement with the surface 146 by engagement of the lower end of the retaining sleeve 144 on a shoulder 160 of the sleeve body 148. In this manner, a secure hold is effected without changing the alignment of the sleeve body 148 after it has been inserted over the positioning dowel 138. In order to insure that the threaded portions are locked in place, the socket portion 134 is provided with an upper end with rim 162 of slight width which is crimped at 164 into a wrench engagement slot 166 defined at the upper edge 168 of the retaining sleeve 144. The retaining sleeve may be threaded into position by a wrench engageable in the slots 166. An insulating material 170 is disposed in the space between the upper top portion of the socket portion 134 and the refractory material 98b.

While specific embodiments of the invention have been shown and described in detail to illustrate the application of the principles of the invention, it will be understood that the invention may be embodied otherwise without departing from such principles.

What is claimed is:

1. A fluidized bed combustor, comprising a housing having a chamber therein with means for discharging gases and means for discharging a heated fluid, support means extending into said chamber, an assembly mounted on said support means in said chamber, said assembly including: a distributor plate top wall having a plurality of tuyeres therein extending through said wall and terminating at discharges on the top of said distributor plate top wall, said chamber including a space above said distributor plate top wall defining a fluidizer bed, means defining a windbox below said distributor plate top wall for fluidizing air, means defining a heat exchanger inlet plenum below said windbox, said inlet plenum having a plurality of tubes extending therethrough for the passage of fluidizing air, a lower fluidizing air inlet chamber section connected to said heat exchanger inlet plenum and defining an inlet for fluidizing air extending into said lower section for flow from said inlet chamber section through said tubes to said windbox, said assembly also defining an annular space around said heat exchanger plenum and said lower section, at least one tubular member extending into said annular space for receiving a fluidized air inlet tube, said housing having an inlet for a fluidizing air inlet tube which is extendable into said tubular member, inlet means connectable to said housing and to said assembly for the inflow of a heat exchanger fluid into said heat exchanger inlet plenum around said tubes, and at least one heat exchanger tube assembly comprising an outer tube and an inner tube arranged in said outer tube in spaced relationship therefrom, said inner tube defining a discharge at its lower end extending to said lower section for the discharge into said chamber below said lower section of heated fluid, said heat exchanger tube assembly further including an outer tube spaced from said inner tube defining an inlet between said inner and outer tubes and extending into said heat exchanger inlet plenum for receiving cooling fluid therefrom for flow of said cooling fluid upwardly in said outer tube in the fluidized bed and then downwardly to said inlet tube for discharge below said lower section, said lower section having a bottom wall with a flange portion engageable on said support means in said chamber.

2. A fluidized bed combustor according to claim 1, wherein said support means includes an annular support flange and insulation means disposed between said bottom wall flange portion and said support flange for supporting said assembly with a minimum of heat transfer to said housing.

3. A fluidized bed combustor according to claim 1, including sealing means disposed between said bottom wall flange portion of said assembly and said support means for sealing the space therebetween.

4. A fluidized bed combustor according to claim 1, wherein there are a plurality of heat exchanger tube assemblies each of which extends through said distributor plate and includes an exterior tube portion mounted in said windbox and an interior portion extending through said windbox, said heat exchanger inlet plenum and said lower section and discharging into the space between said lower section and the bottom of said housing.

5. A fluidized bed combustor according to claim 1, wherein said nozzles comprise a plurality of cylindrical tuyeres each extending above the top of said distributor plate and having discharge openings for fluidizing air extending downwardly into the fluidizing bed.

6. A fluidizing bed combustor according to claim 1, wherein said at least one tube assembly includes a fitting on the lower end thereof having a conical lower end, said bottom wall of said assembly including a lower tubular element having a top conical surface and forming a receiving socket with a conical surface into which said fitting is positioned, said fitting and said lower tubular element being hollow and being filled with insulation, said outer tube having an adapter, said windbox having a tubular portion extending therethrough with a receiving shoulder engageable with said adapter.

7. A fluidizing bed combustor according to claim 1, wherein said tubular element for receiving a fluidizing air inlet tube comprises an inner cylindrical portion, sealing means defined between said fluidizing air inlet tube and said tubular portion and defining an interengageable piston seal therebetween.

8. An assembly for heat exchanger cooling tubes, fluidizing air supply and fuel supply for use in a fluidized bed combustor, comprising distributor plate top wall, a plurality of tuyeres extending through said top wall and having openings at the bottom of said top wall for receiving fluidizing air and having discharge portions above said top wall for discharging fluidizing air into a fluidizer bed which will be formed above the top wall, wall means below said top wall distributor plate defining a windbox for fluidizing air, said windbox for fluidizing air having a plurality of tubular support elements extending therethrough for the passage of heat exchanger cooling tubes therethrough, means defining a heat exchanger inlet plenum below said windbox including heat exchanger passage tubes extending therethrough for the heat exchanger cooling tube, a plurality of fluidizer air tubes extending through said heater exchanger inlet plenum, a lower section defined below said heat exchanger plenum defining an inlet for fluidizing air communicating with the fluidizer air tubes for passage through said heat exchanger inlet plenum and the fluidizing air tube to said windbox, said lower section having a support plate with a flange means for supporting said assembly in a fluidized bed combustor and for at least partially supporting the heat exchanger cooling tubes.

9. An assembly according to claim 8, wherein said assembly includes means defining an annular wall around said heat exchanger plenum and said lower sections, said annular wall having a tubular element defined therein defining a cylindrical receiving chamber and a fluidized air supply tube having a piston exterior surface engageable in sealing engagement with the receiving chamber.

10. An assembly according to claim 8, including heat exchanger tubes each comprising a plurality of assemblies of inner and outer telescopically interengaged tubes, said outer tube being spaced from said inner tube and defining at the connection thereof to said heat exchanger plenum, an inlet for cooling air to flow upwardly through said outer tube in the space therebetween and upwardly above said distributor plate and then downwardly through said inner tube and through said heat exchanger plenum and said lower section for discharge below said lower section, said outer tube having adapter means thereon for supporting said outer tube in the tubular receiving elements extending through said windbox.

11. An assembly according to claim 8, wherein said lower section includes a plate having a tubular socket for supporting said inner tube of said heat exchanger tube assembly.

12. An assembly according to claim 8, wherein said heat exchanger inlet plenum has a plurality of inlet openings for receiving a cooling fluid, said cooling fluid flowing in said heat exchanger plenum around said fluidizing air tubes which extend therethrough and into the space between said inner and outer heat exchanger tubes.

13. A fluidized bed combustor, comprising a housing having a chamber therein and a top with a discharge for gases and a bottom with a discharge for heated fluid, an assembly in the lower portion of said chamber including a heat exchange inlet plenum and a windbox and a distributor plate wall, a portion of said chamber above said distributor plate wall defining a fluidized bed, support means supporting said assembly in said chamber at a spaced location above the bottom thereof, the space in said chamber between said bottom and said assembly defining a fluid discharge plenum opening to said discharge, means for directing fluidized air into said assembly and through said heat exchanger plenum and into said windbox, nozzle means in said distributor plate for discharging fluidized air from said windbox into said fluidizing bed, means for directing coal into said fluidizing bed for ignition with said fluidizing air, and heat exchanger tube means mounted on said assembly and extending into said fluidizing bed having a cooling fluid inlet for the inflow of bed cooling air to said tube assembly, said support means including an annular first support flange extending around the periphery of said chamber, said assembly including a lower plate having a second support flange portion engaged on said first support flange, insulation means disposed between said first support flange elements and said second support flange portion, said insulation means comprising a plurality of stacked rings of insulation and a plurality of rings of wire screening interposed between at least some of said stacked rings of insulation and thread means sewn to said rings to hold them together.

14. A fluidized bed combustor according to claim 13, including spacer means disposed between said first support flange elements and said second support flange portion for maintaining a spacing therebetween occupied by said insulation means.

15. A fluidizing bed combustor according to claim 13, wherein said combustor housing includes severable upper and lower portions having interengaged annular connecting flanges, said first support flange being carried by said lower portion, and bolt means for clamping said upper and lower portions together at said connecting flanges.

16. A fluidized bed according to claim 13, wherein said insulation means further includes a plate element disposed between and engaged against said second support flange portion of said assembly support plate and said first support flange, a sealing member carried by said plate element adjacent to and disposed in sealing engagement with the respective support plate and said lower plate of said assembly.

17. A method of erecting and disassembling a fluidized bed reactor which comprises a housing having separable upper and lower shell portions which are clamped together and an assembly in said housing which is supported on the lower shell portion and which includes; a top distributor plate overlying a windbox, a heat exchanger inlet plenum which has a heat exchanger fluid opening for receiving a fluid connection pipe and a lower support section having a peripherally slotted annular flange which overlies and is clamped to a support ring of the lower shell portion and which also includes tuyeres mounted on the distributor plate and connected to the windbox and a plurality of heat exchanger tube assemblies having an outer tube extending into and supported by the windbox and an inner tube within the outer tube extending below the inner tube and mounted in the lower section and partly supportable on the outer tube at the windbox and defining an air inlet between the inner and outer tubes in the heat exchanger inlet plenum, and also including an annular air inlet chamber having a plurality of tubular inlet openings for receiving fluidizing air conduits, comprising: positioning the annular flange of the assembly on the support ring of the lower shell portion and clamping the assembly to the lower shell portion, connecting the lower shell portion with the assembly to the upper shell portion so as to position the assembly within the upper shell portion, connecting fluidizing air conduits through the upper shell portion into the respective tubular inlet openings of the inlet chamber and connecting the fluid connection pipe through the upper shell into the heat exchanger fluid opening of the inlet plenum.

18. A method according to claim 17, including connecting the heat exchanger tube assemblies to the windbox while the upper and lower sections are clamped together.

* * * * *